No. 706,406. Patented Aug. 5, 1902.
G. L. GOWLLAND.
CURRENT METER.
(Application filed Mar. 22, 1902.)
(No Model.) 2 Sheets—Sheet 1.

WITNESSES:
James F. Duhamel
Walton Harrison

INVENTOR
George L. Gowlland
BY
Munn
ATTORNEYS

No. 706,406. Patented Aug. 5, 1902.
G. L. GOWLLAND.
CURRENT METER.
(Application filed Mar. 22, 1902.)

(No Model.) 2 Sheets—Sheet 2.

WITNESSES:
James P. Duhamel
Walton Harrison

INVENTOR
George L. Gowlland
BY
ATTORNEYS

UNITED STATES PATENT OFFICE.

GEORGE LEWIS GOWLLAND, OF PETERBORO, CANADA.

CURRENT-METER.

SPECIFICATION forming part of Letters Patent No. 706,406, dated August 5, 1902.

Application filed March 22, 1902. Serial No. 99,472. (No model.)

*To all whom it may concern:*

Be it known that I, GEORGE LEWIS GOWLLAND, a subject of the King of Great Britain, and a resident of Peterboro, in the Province of Ontario and Dominion of Canada, have invented new and useful Improvements in Current-Meters, of which the following is a full, clear, and exact description.

My invention relates to meters for measuring electric currents, and more particularly to the type known as "induction motor-meters," which are actuated by a pulsating or intermittent current—such, for instance, as the ordinary alternating current.

One object of the invention is to provide a meter of this type having a large range and provided with a rotating armature that shall run at a speed exactly proportionate to the amount of current passing through the meter. Another object, and one of special importance, is to provide a meter which will work equally well with either inductive or non-inductive loads.

This meter should not be confounded with any meter having the usual so-called "ninety-degree lag" or any similar phenomena. It differs from such a meter in this respect—to wit, that the flux produced at the poles of the magnets on the so-called "voltage" side of the meter is a stationary flux and is not of a revoluble nature.

I obtain the rotation of the disk partly by using a so-called "voltage-magnet," the core of which is split into two members and a flat bar of copper inserted therebetween.

I have found that a flux-plate composed of thin sheets of laminæ or copper disposed in planes parallel with each other and also parallel with the plate when excited by a magnet in immediate proximity to said plate produces a considerable rotative effect. This effect appears to be governed largely by the amperage rather than the voltage of the current.

Reference is to be had to the accompanying drawings, forming a part of this specification, in which similar characters of reference indicate corresponding parts in all the figures.

Figure 1:
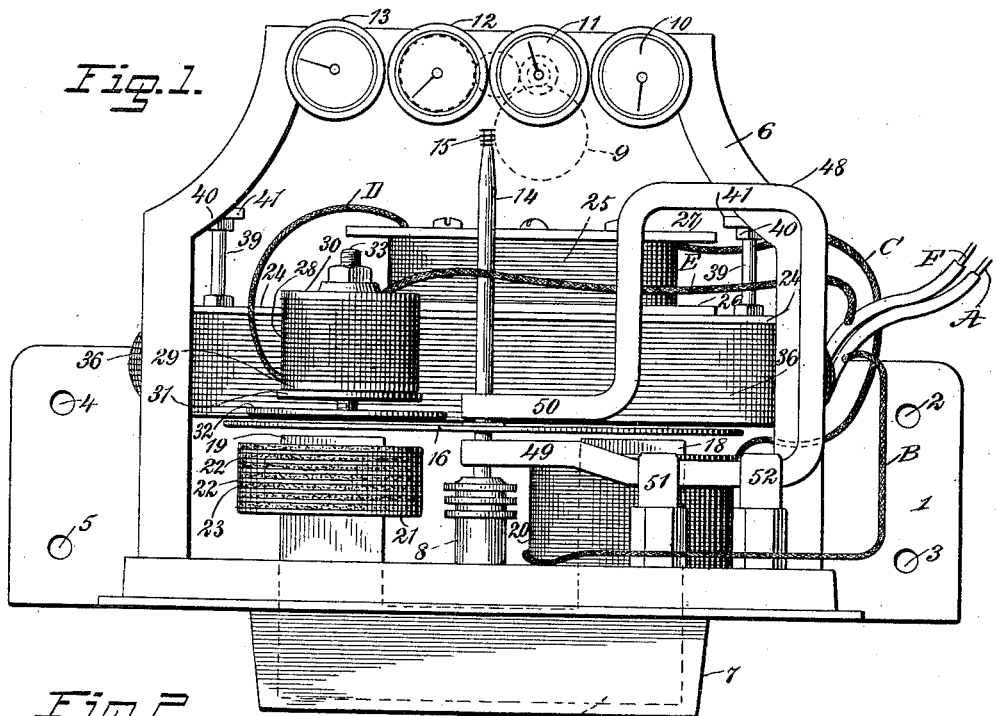
Figure 2:
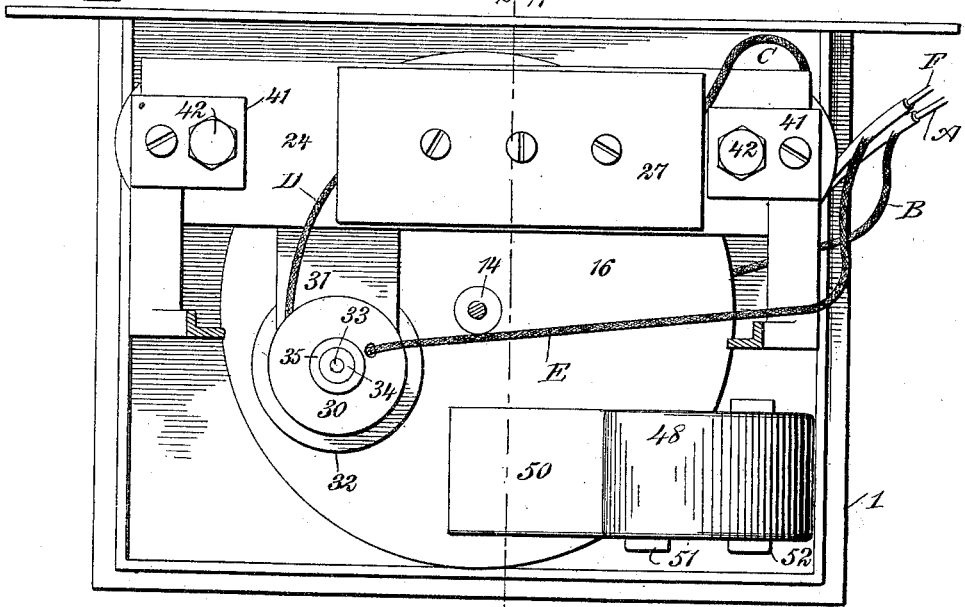
Figure 3:
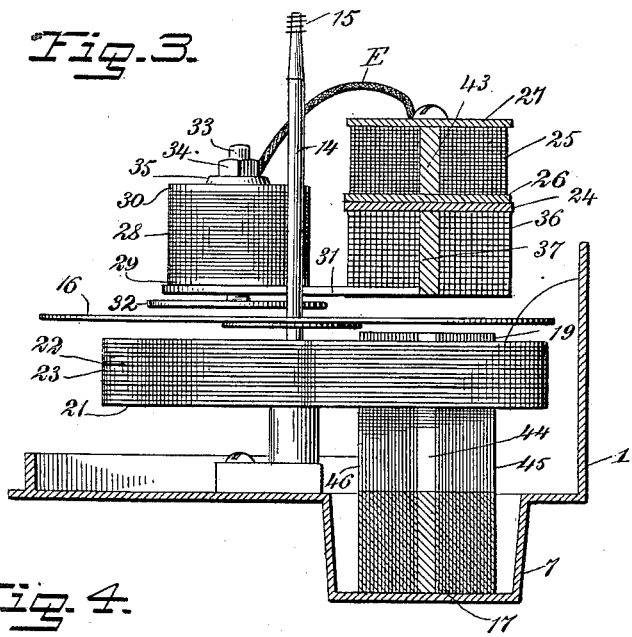
Figure 4:
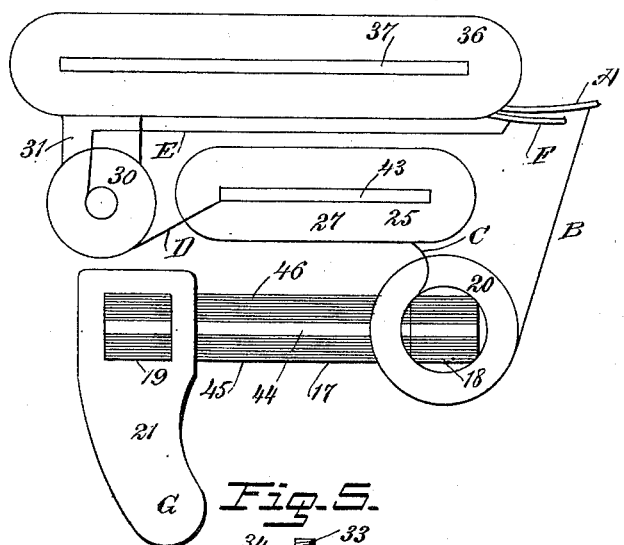
Figure 5:
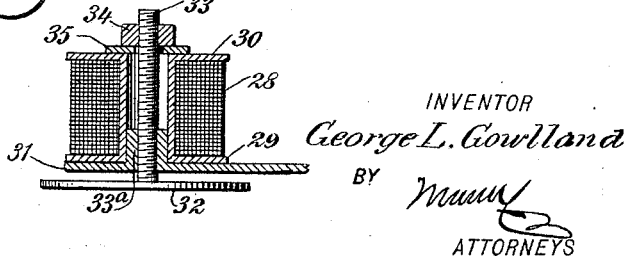

Figure 1 is a front elevation of my meter. Fig. 2 is a plan view of the same. Fig. 3 is a central section upon the line $x\ x$ of Fig. 2. Fig. 4 is a diagram showing the electric connections, and Fig. 5 is a sectional detail showing the voltage-solenoid and its immediate connections.

The frame 1 is provided with screw-holes 2 3 4 5 and with a bracket 6 and a depending basin 7 for the purpose of supporting the several parts.

8 is a bearing for supporting the spindle of the disk hereinafter described. A train of clockwork 9 is provided for the purpose of actuating the speed-dials 10 11 12 13 in the usual manner. The revoluble spindle 14 is provided with a worm 15 for actuating the clockwork, and a metallic disk 16, made of non-magnetic but conducting material, preferably aluminium, is mounted on the spindle and revoluble therewith. A magnet 17, provided with poles of opposite sign 18 19, is mounted in the position shown in dotted lines in Fig. 1 and full lines in Fig. 3. The pole 18 of this magnet is provided with a winding 20 for the purpose of energizing the same. The other pole 19 is not provided with such a winding, but instead is fitted with a composite flux-plate 21, composed of thin sheets or laminæ 22 of copper and thin sheets of insulating material 23, disposed alternately therewith, as indicated more particularly in Fig. 1. The general shape of this flux-plate is somewhat like that of a horn, as indicated in Fig. 4.

24 is a plate supporting a large solenoid-coil, hereinafter described. The so-called "starting-coil" is shown at 25 and is provided at its top and bottom with plates 26 27, preferably of brass. A small solenoid 28 of cylindrical form is provided at its respective bottom and top with the brass disks 29 30. This solenoid rests upon a tongue-shaped member 31, constituting another flux-plate. Another flux-plate is shown at 32 and is not only revoluble relative to the solenoid-coil 28, but is vertically adjustable relatively thereto by means of the screw 33, nut 34, and washer 35, together with the sleeve 33ª, integrally mounted upon the tongue-shaped plate 31. The large solenoid-coil 36 is connected serially with the mains and is provided with a central flat core 37 of non-magnetic but conducting material, preferably copper. The solenoid and copper core depend from the plate 24, which is in turn supported by the stems 39, these stems depending from brackets 41 by means of heads 42. The nuts 40 are for the purpose of tightening the stems in position. The tongue-shaped member of flux-plate 31 is secured riggidly upon the copper core 37, so as to extend laterally therefrom, and thus support the solenoid 28 at a little distance from the solenoid-coil 36. The starting-coil 25 is a longitudinal solenoid of high resistance and is provided centrally with a longitudinal core 43, of copper, the general shape of the core being similar to that of the core 37.

The magnet 17 is provided with a composite core built up of two iron members 45 46, sandwiched between which is a plate of copper 44. The copper plates or cores 43, 37, and 44 are preferably placed in vertical alinement, as indicated more particularly in Fig. 3.

A permanent magnet 48 is bent into an eccentric shape (shown in Fig 1) and is provided with poles of different sign 49 50 and is mounted in brackets 51 52, so that the poles will be upon opposite sides of the revoluble disk 16 and will also be opposite each other. The purpose of this permanent magnet is merely to induce eddy-currents in the revoluble disk for the purpose of creating a weak resistance or passive torque, having a slight tendency to stop the wheel. The magnet acts as a "load," so to speak, and prevents the disk from turning in consequence of its momentum when it is not being actuated by a current. The poles 49 50 of this magnet will of course have this damping effect, for the reason that the eddy-currents which they generate are of a character tending to bring all moving parts to a state of rest.

The mains are shown at A F. The course of the currents, as indicated in Fig. 4, is as follows: first, main A, through solenoid 36 to main F; second, main A, wire B, magnet-coil 20, wire C, solenoid 25, wire D, solenoid 28, wire E, to main F. It will be observed that the coil 36 is therefore in series and that the other circuit members are connected serially with each other, but in parallel relation to the coil 36.

The flux-plate 32 is adjustable, as above described, and can be brought down within a fraction of an inch of the upper face of the revoluble disk. The composite flux-plate 21 is not adjustable; but the rounded end of the same preferably projects to a point adjacent to the flux-plate 32. With the parts thus arranged an electromagnetic flux of a peculiar kind is generated by the magnet-pole 19 in the copper laminæ surrounding the same and is carried out to the end of the horn 21, past the center of the flux-plate 32. The electromagnet-flux mentioned by its inductive effect upon the revoluble disk 16 produces currents therein. These currents are of the same direction as those induced by the solenoid 28. By means of this last-mentioned solenoid an electromagnetic flux is produced, and the same is led downward by means of the flux-plate 32, which, as above described, can be moved in close proximity to the upper face of the revoluble disk.

The greatest and most satisfactory effect appears to be produced when the flux-plate 32 and the flux-plate 21 affect each other through the disk. Removed from each other to different points relatively to the circumference to the disk, the flux-plates would have a comparatively slight effect, one which would perhaps not be perceptible in causing the disk to rotate. The arrangement as described, however, produces a powerful revolution of the disk. I have found, too, that the rotation of the disk is much stronger and more satisfactory when the three copper cores are placed in vertical alinement, as above described.

The precise manner in which the eddy-currents act in this machine is very difficult of explanation. It appears, however, the electromagnetic effect caused by the induction of the magnet 17 upon the laminated flux-plate 21 produces two distinct centers of magnetic disturbances, one being disposed out toward the rounded end of the plate, the other being distributed somewhat in the shape of a ring, or rather a horseshoe, adjacent to the iron member 45 of the magnet. In other words, there appear to be two magnetic disturbances, one playing around the iron member 45 of the magnet, the other playing not around the iron member 46 of the magnet, but rather around the point G adjacent to the outer end of the flux-plate.

The electromagnetic disturbance in the flux-plate 21 adjacent to the iron member 45 appears to have the effect of making the disk more sensitive and to have no other effect so far as I can discover. This effect, however, has its utility, especially when it is desirable to use the instrument for measuring delicate currents. The sensitiveness of the instrument can be governed to some extent at will by adjusting the flux-plate 32, as above described.

I find that the flux produced by the flux-plate 21 can be increased very much by the use of the laminæ described. There would be a slight effect if the member 21 were made in a solid integral bar, and perhaps the effect is not exactly proportioned to the number of laminæ; but it is a fact that a considerable number of the laminæ may augment the propulsive effect upon the disk to a remarkable degree.

It is desirable that the flux-plate 31 should extend at a right angle from the bar 37.

With a meter of the type above described the aluminium disk need not be placed so near the magnet-poles as is required in most other meters. This fact presents a considerable practical advantage—to wit, that particles of dust or dirt accumulating upon the plate do not interfere with its action, and any slight distortion of the disk is less objectionable than is the case with other meters.

Having thus described my invention, I claim as new and desire to secure by Letters Patent—

1. In a current-meter in which a magnetic flux is employed for giving movement to the indicating mechanism, the combination of a revoluble member, a magnet and a flux-plate connected with said magnet and extending therefrom to a point adjacent to said revoluble member.

2. A current-meter comprising indicators, a revoluble disk of conducting material for actuating the same, electric mains, a solenoid-coil provided with a core of non-magnetic conducting material, a conducting-plate of non-magnetic material mounted upon said core, a flux-plate connected with said conducting-plate and disposed adjacent to said disk for the purpose of inducing eddy-currents therein, a magnet connected with said mains, and a laminated flux-plate connected with said magnet and disposed adjacent to said disk for inducing eddy-currents therein, said flux-plates being mounted adjacent to each other and upon opposite sides of said disk.

3. A current-meter, comprising indicating mechanism, a revoluble member for actuating said mechanism and driven by eddy-currents, electric mains and a magnet energized thereby, the said magnet being provided with a flux-plate of a non-magnetic material disposed adjacent to said revoluble member for generating eddy-currents.

4. A current-meter, comprising indicating mechanism, a revoluble member for actuating said indicating mechanism and driven by eddy-current, electric mains, a magnet energized thereby, and a flux-plate of non-magnetic material connected with said magnet and extending therefrom to a point adjacent to said revoluble member.

5. A current-meter comprising indicators, a revoluble disk of conducting material for actuating the same, a magnet provided with a composite core consisting of alternately-disposed members of magnetic material and non-magnetic material, and a flux-plate built up of laminæ of conducting but non-magnetic material, said laminæ being insulated from each other, and said flux-plate being mounted upon said magnet and disposed adjacent to said disk.

6. A current-meter comprising indicators, a revoluble disk of conducting material for actuating the same, a laminated flux-plate disposed adjacent to said disk, another flux-plate mounted adjacent to said disk and also adjacent to said laminated flux-plate, and magnetic members for exciting both of said flux-plates, said magnetic members being energized by the current to be measured.

7. A current-meter comprising indicators, a revoluble disk of conducting material for actuating the same, a magnetic member, means connected with the main circuit for exciting said magnetic member, and a flux-plate built up of conducting laminæ insulated from each other and fitted upon said magnetic member, said laminæ being disposed parallel with said disk and adjacent thereto.

8. A current-meter comprising indicators, a revoluble member of non-magnetic but conducting material for actuating the same, a magnetic member consisting of a solenoid-coil provided with a longitudinal core of conducting but non-magnetic material, a flux-plate of similar material connected with said core and extending therefrom to a point adjacent to said disk, and a solenoid-core provided with a plate for generating eddy-currents, said plate being disposed adjacent to said disk.

9. A current-meter comprising indicators, a revoluble member of non-magnetic but conducting material for actuating the same, a magnetic member consisting of a solenoid-coil provided with a longitudinal core of conducting but non-magnetic material, a flux-plate of similar material connected with said core and extending therefrom to a point adjacent to said disk, a solenoid-coil provided with a plate for generating eddy-currents, said plate being disposed adjacent to said disk, and means controllable at will for adjusting said flux-plate relatively to said disk.

10. A current-meter comprising indicators, a revoluble disk of non-magnetic but conducting material for actuating the same, a two-pole magnet having one of its poles provided with a coil and the other not so provided, and a longitudinal flux-plate of non-magnetic but conducting material mounted upon said last-mentioned pole, said flux-plate being disposed parallel to said disk, and means for energizing said magnetic member.

11. A current-meter comprising indicators, a revoluble disk of non-magnetic but conducting material for actuating the same, a two-pole magnet consisting of two iron members and a copper member sandwiched between the same, all of said members being provided with a common winding, said magnet having both of its poles disposed adjacent to said disk, and a laminated flux-plate detachably secured upon one of said poles and disposed adjacent to said disk.

12. A current-meter comprising indicators, a revoluble disk of non-magnetic but conducting material for actuating the same, a magnet, means for exciting the same from the current to be measured, a flux-plate mounted upon said magnet and built up of laminæ insulated from each other, said laminæ being disposed parallel to said disk, a solenoid-coil provided with a core of non-magnetic but conducting material, a flux-plate connected with said core and extending therefrom to a point adjacent to said disk, said flux-plates being disposed opposite to each other and also adjacent to opposite positions of said disk, and a solenoid provided with a flux-plate mounted adjacent to said disk and adjustable relatively thereto.

In testimony whereof I have signed my name to this specification in the presence of the subscribing witnesses.

GEORGE LEWIS GOWLLAND.

Witnesses:
    JAMES W. CURRY,
    REGINALD W. EGAN,
    J. H. MCCLELLAN.